United States Patent [19]

Miyawaki et al.

[11] Patent Number: 5,056,637

[45] Date of Patent: Oct. 15, 1991

[54] SYSTEM FOR CONTROLLING SPEED OF AN ENGINE FOR A MOTOR VEHICLE HAVING A CONTINUOUSLY VARIABLE TRANSMISSION

[75] Inventors: Motohisa Miyawaki, Kanagawa; Hiroshi Tanaka, Tokyo, both of Japan

[73] Assignee: Fuji Jukogyo Kabushiki Kaisha, Tokyo, Japan

[21] Appl. No.: 628,174

[22] Filed: Dec. 14, 1990

[30] Foreign Application Priority Data

Dec. 28, 1989 [JP] Japan .................... 1-343302

[51] Int. Cl.$^5$ .................... B60K 41/02; B60K 41/28
[52] U.S. Cl. .................... 192/0.058; 192/0.082; 192/0.094
[58] Field of Search ........... 192/0.058, 0.046, 0.082, 192/0.055, 0.094; 123/328; 364/426.02

[56] References Cited

U.S. PATENT DOCUMENTS 4,363,389 12/1982 Zaunberger et al. ....... 192/0.094 X

FOREIGN PATENT DOCUMENTS 0285144 12/1986 Japan ..................... 192/0.055
62-247928 10/1987 Japan .
2163511 2/1986 United Kingdom ........... 192/0.055

Primary Examiner—Rodney H. Bonck
Attorney, Agent, or Firm—Martin A. Farber

[57] ABSTRACT

A motor vehicle has a continuously variable belt-drive automatic transmission, an automatic clutch provided between the engine and the automatic transmission, a hydraulic control system and a hydraulic circuit including the oil pump for controlling the transmission. A wheel lock signal is produced when the deceleration of the wheel speed is so large that the wheels may be locked. In response to the wheel lock signal, a clutch release signal is produced when the engine speed is lower than a predetermined low speed. In response to the clutch release signal, the automatic clutch is released and the engine speed is increased, thereby maintaining sufficient output of the oil pump.

4 Claims, 4 Drawing Sheets

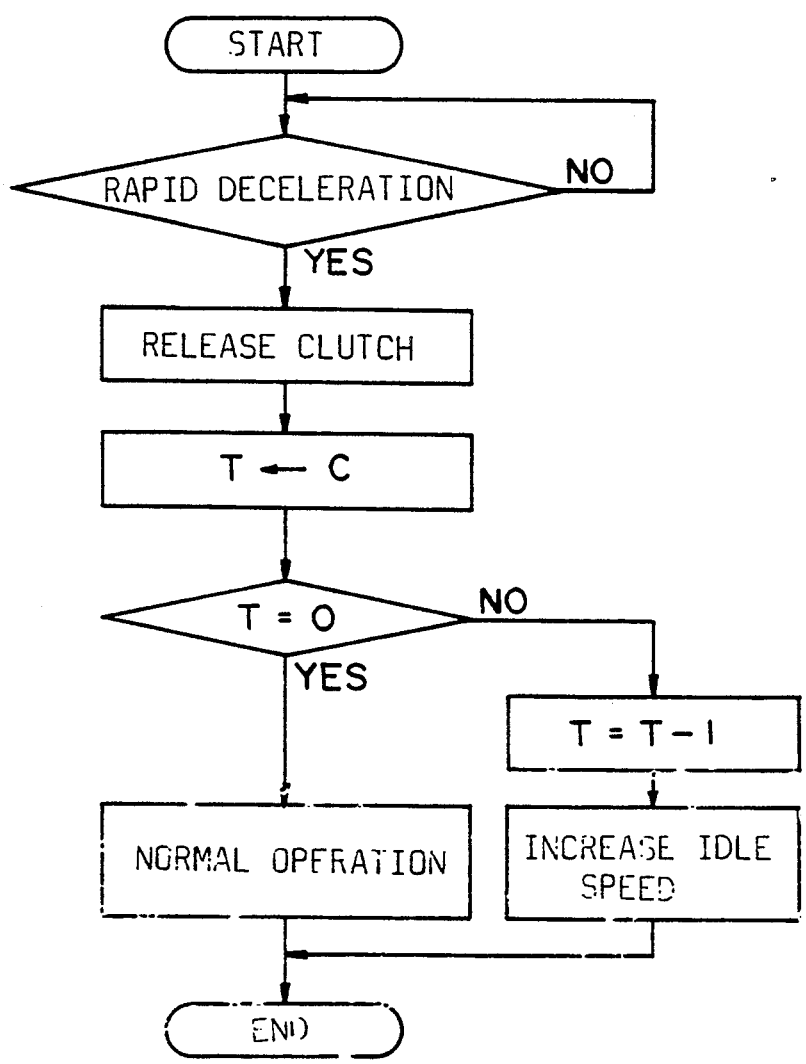

5,056,637

SYSTEM FOR CONTROLLING SPEED OF AN ENGINE FOR A MOTOR VEHICLE HAVING A CONTINUOUSLY VARIABLE TRANSMISSION

BACKGROUND OF THE INVENTION

The present invention relates to a system for controlling speed of an engine for a motor vehicle having a continuously variable belt-drive automatic transmission, and more particularly to a system for controlling engine speed for a motor vehicle having an automatic clutch and an antilock brake system.

It has become popular to provide an antilock brake system (hereinafter called ABS) on a motor vehicle in order to prevent wheels from locking when the vehicle is braked on a road having a low coefficient of friction, thereby improving a directional stability and maneuvering the vehicle. The ABS electronically controls a pressure of brake fluid and wheel speed to prevent the wheel from locking. However, in a vehicle provided with a continuously variable belt-drive transmission where a transmission ratio and line pressure are precisely controlled in accordance with wheel speed and other factors, the operation of the ABS much influences the control of the transmission. Hence it is preferable to control both the ABS and the transmission when the ABS is operated.

On the other hand, when the wheels are locked by rapid braking or wheel speed is rapidly decreased as is occurred in the operation of the ABS, it is necessary to disengage the automatic clutch in order to prevent the engine from stalling. When the clutch is disengaged, the engine speed decreases to an idle speed. As a result an output of an oil pump driven by the engine rapidly reduces, which causes decrease of the line pressure.

At the same time, oil pressure applied to a drive pulley of the continuously variable transmission decreases as well as the line pressure so that the belt slips on the pulleys. Thus, it is necessary to more function the oil pump.

Japanese Patent Application Laid-Open 62-247928 discloses an engine speed control system. In the system, when a driver selects an optimum transmission ratio, a throttle valve of the engine is controlled to maintain the engine speed to a set speed. However, the system is for controlling a cruise control system while the clutch is engaged. Thus, as the system is not for controlling the ABS, the system cannot be applied during the release of the clutch.

SUMMARY OF THE INVENTION

The object of the present invention is to provide a system for controlling an engine speed control system for preventing an engine speed from decreasing at releasing an automatic clutch, thereby maintaining a sufficient output of the oil pump to prevent the belt from slipping.

According to the present invention, there is provided a system for controlling speed of an engine for a motor vehicle having a continuously variable belt-drive automatic transmission, an automatic clutch provided between the engine and the automatic transmission, and a hydraulic control system having a hydraulic circuit including the oil pump for controlling the transmission.

The system comprises an engine speed sensor for detecting speed of the engine, a wheel speed sensor for detecting speed of wheels of the vehicle, determining means responsive to the speed of the wheels for detecting a rapid deceleration and for producing a wheel deceleration signal, clutch release determining means responsive to the wheel deceleration signal for producing a clutch release signal when the engine speed is lower than a predetermined low speed, clutch control means responsive to the clutch release signal for releasing the automatic clutch, and actuating means responsive to the clutch release signal for increasing the speed of the engine, thereby sufficient output of the oil pump.

In an aspect of the invention, the system further comprises an antilock brake system responsive to the wheel deceleration signal for producing an antilock brake signal, the clutch release determining means being arranged to respond to the antilock brake signal to produce the clutch release signal. The actuating means is arranged to effect for a predetermined time after generation of the clutch release signal.

The other objects and features of the present invention will become understood from the following description with reference to the accompanying drawings.

BRIEF DESCRIPTION OF THE DRAWINGS

FIG. 4 is a flowchart showing the operation at a release of a clutch in accordance with the present invention.

DETAILED DESCRIPTION OF THE PREFERRED EMBODIMENT

Figure 1:
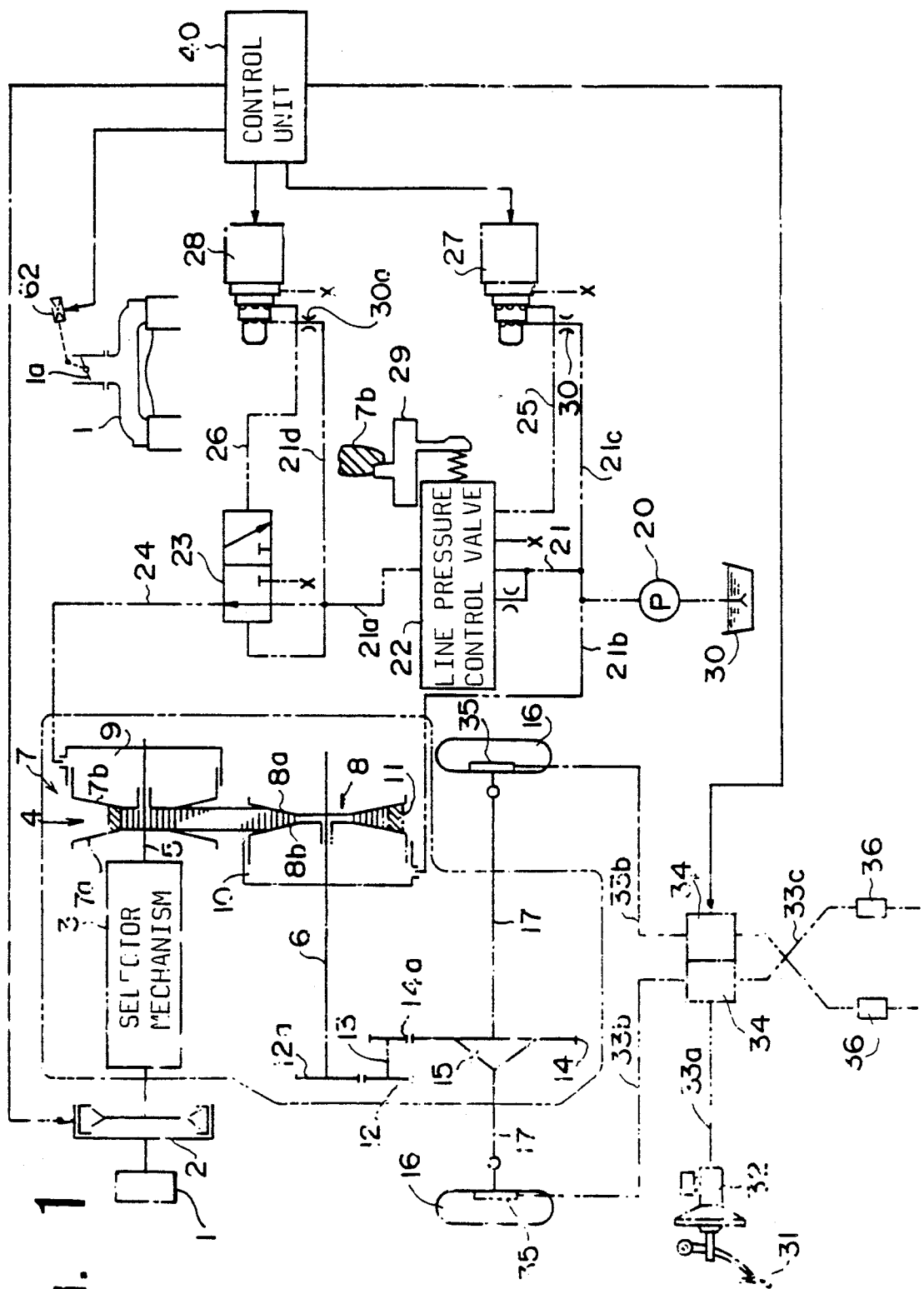
FIG. 1 a schematic diagram of a continuously variable belt-drive transmission to which the present invention is applied, and a hydraulic control circuit thereof.

Referring to FIG. 1, a continuously variable belt-drive automatic transmission for a motor vehicle, to which the present invention is applied, comprises an automatics clutch 2 for transmitting power of an engine 1 to a belt-drive continuously variable transmission 4 through a selector mechanism 3. The engine 1 is provided with an actuator 62 for increasing engine speed by operating a throttle valve 1a in accordance with a signal from a control unit 40.

The belt-drive transmission 4 has a main shaft 5 and an output shaft 6 provided in parallel with the main shaft 5. A drive pulley (primary pulley) 7 and a driven pulley (secondary pulley) 8 are mounted on the main shaft 5 and the output shaft 6, respectively. A fixed conical disc 7a of the drive pulley 7 is integral with the main shaft 5 and an axially movable conical disc 7b is axially slidably mounted on the main shaft 5. The movable conical disc 7b also slides in a cylinder 9 formed on the main shaft 5 to provide a servo device.

A fixed conical disc 8a of the driven pulley 8 is formed on the output shaft 6 opposite to the movable conical disc 7b and a movable conical disc 8b is slidably mounted on the shaft 6 opposite to the disc 7a. The movable conical disc 8b has a cylindrical portion which is slidably engaged in a cylinder 10 of the output shaft 6 to form the servo device. A belt 11 engages with the drive pulley 7 and the driven pulley 8. The cylinder 9 of the drive pulley 7 has a pressure receiving area thereof which is larger than that of the cylinder 10 of the driven pulley 8. Thus, a running diameter of the belt 11 on the pulleys 7, 8 is varied dependent on driving conditions.

Secured to the output shaft 6 is a drive gear 12a which engages with an intermediate reduction gear 12 on an intermediate shaft 13. An intermediate reduction gear 12 on an intermediate shaft 13. An intermediate gear 14a on the shaft 13 engages with a final reduction gear 14. A rotation of the final reduction gear 14 is transmitted to axles 17 of vehicle driving wheels 16 through a differential 14.

Describing a hydraulic control circuit, oil in an oil reservoir 30 is supplied to a line pressure control valve 22 through a line pressure passage 21 by an oil pump 20. The oil pump 20 further is connected with the cylinder 10 of the driven pulley 8 through a passage 21b. The line pressure control valve 22 is communicated with a transmission ratio control valve 23 through a passage 21a. The cylinder 9 of the drive pulley 7 is applied with pressurized oil through the passage 21, the line pressure control valve 22, the passage 24. A conduit 25 is connected between the line pressure control valve 22 and a solenoid operated on-off valve 27. A conduit 26 is connected between the transmission ratio control valve 23 and a solenoid operated on-off valve 28. The solenoid operated valve 27 is connected with the pump 20 through a passage 21c having an orifice 30, and the valve 28 is communicated with the passage 21a through a passage 21d having an orifice 30a.

The solenoid operated valve 27 is adapted to be operated by duty signals from a control unit 40 for producing control pressure in the form of pulses. The control pressure is applied to the line pressure control valve 22. The line pressure control valve 22 is connected with a sensor shoe 29 through a spring retainer. The sensor shoe 29 is engaged with the movable disk 7b of the drive pulley 7 so as to detect an actual transmission ratio i. Thus, the line pressure $P_L$ is controlled in accordance with the transmission ratio i, and an engine torque Te.

The solenoid operated valve 28 is also operated by the duty signals and produces reducing pressure which is applied to the transmission ratio control valve 23 for shifting a spool of the valve 23 to an oil supply position and an oil drain position by the duty ratio. Thus, the flow rate Q of the oil supplied to or drained from the cylinder 9 of the drive pulley 7 is controlled to provide an optimum transmission ratio i.

Describing a brake system having an ABS, a brake pedal 31 is connected to a master cylinder 32 for producing fluid pressure in accordance with a depression of the brake pedal. The master cylinder 32 is communicated with a pair of modulators 34 of the ABS through a pipe 33a. A pipe 33b from each modulator 34 is communicated with a brake device 35 of each driving wheel 16. The modulator 34 is further communicated with a brake device of the driven wheels (not shown) through a proportioning valve 36 for adjusting the pressure to the driven wheels. The modulator 34 has various solenoid valves for respectively reducing the pressure, increasing and holding the pressure, so as to control the brake fluid pressure when the antilock brake system is in operation in accordance with a signal from the control unit 40.

Figure 2:
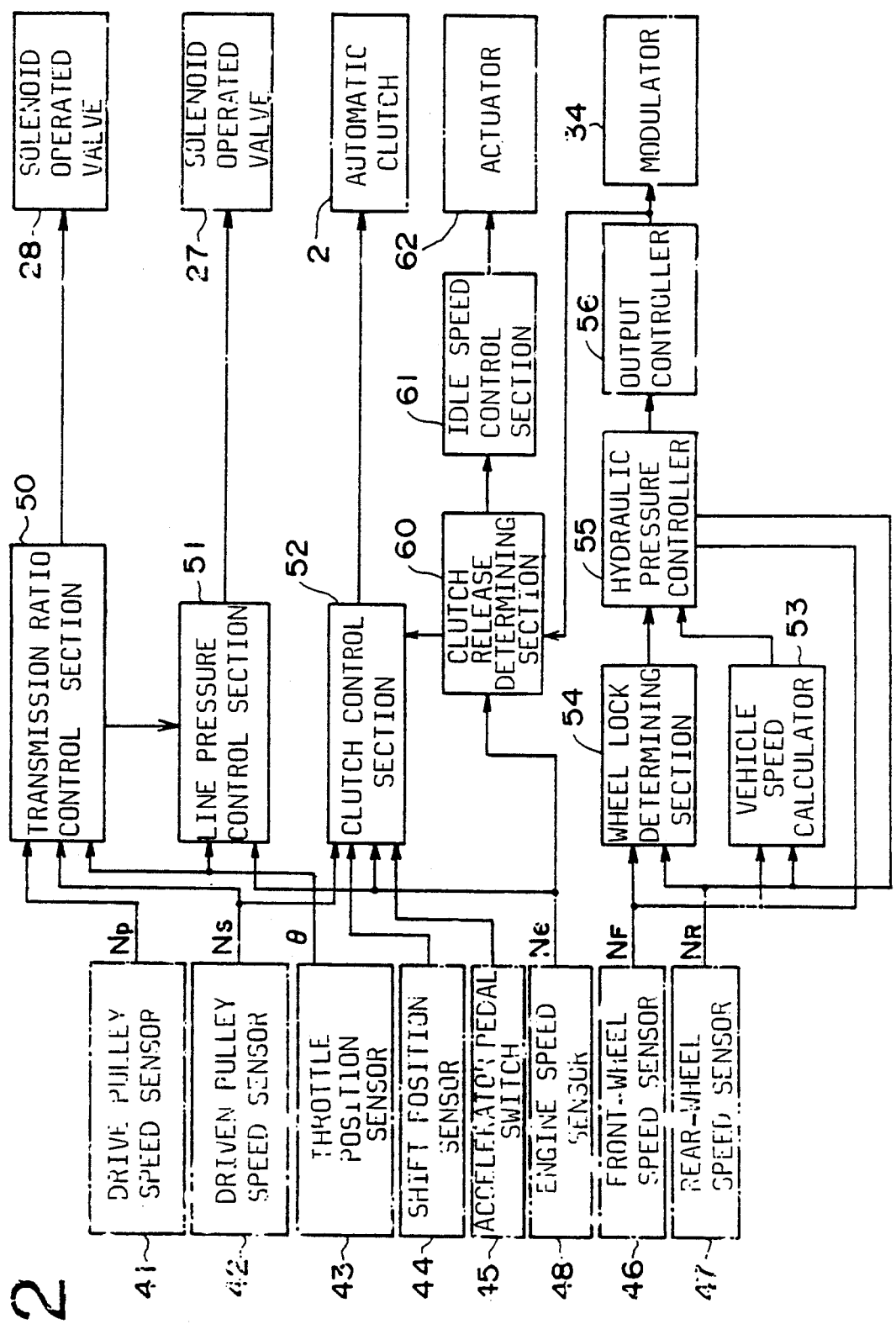
FIG. 2 shows a block diagram of a control unit of the present invention.

Referring to FIG. 2, the system is arranged to control the transmission ratio i, the line pressure, the automatic clutch 2, the ABS modulator 34 and the throttle valve 1a. In the system, provided are a drive pulley speed sensor 41, a driven pulley speed sensor 42, a throttle position sensor 43, a shift position sensor 44, an accelerator pedal switch 45, an engine speed sensor 48, a front-wheel speed sensor 46 and a rear-wheel speed sensor 47.

Output signals $N_p$ and NS of the sensors 41, 42 and the output signal $\theta$ representing an opening degree of the throttle position sensor 43 are fed to a transmission ratio control section 50. The control section 50 calculates the actual transmission ratio i and a desired transmission ratio id in accordance with the input signals. A transmission ratio changing speed di/dt is calculated in accordance with the difference between the actual transmission ratio i and the desired transmission ratio id. A duty ratio D determined in accordance with the transmission ratio changing speed (di/dt) is supplied to the solenoid operated on-off valve 28.

The engine speed signal Ne and the throttle valve opening degree $\theta$ are applied to a line pressure control section 51. In the line pressure control section, the engine torque Te is estimated based on the engine speed Ne and the throttle opening degree $\theta$. A duty ratio $D_L$ which corresponds to a desired line pressure dependent on the engine torque Te is determined and supplied to the solenoid operated on-off valve 27.

The engine speed Ne, the driven pulley speed $N_S$ representing the vehicle speed, and one of the output signals of the shift position sensor 44 are fed to a clutch control section 52. The control section 52 determines an operational mode of the automatic clutch 2 in accordance with the driving conditions of the vehicle. When the vehicle is starting or under a condition where the complete engagement of the clutch 2 is preferable, the clutch current the level of which is appropriate for each operation mode is applied to the clutch 2. When the vehicle speed is lower than a predetermined reference speed, the clutch current is automatically cut off, thereby preventing engine from stalling.

For controlling the ABS, a vehicle speed calculator 53 is fed with a front-wheel speed NF from the front-wheel speed sensor 46 and a rear-wheel speed NR from the rear-wheel speed sensor 47. A vehicle speed V is calculated as an average of the wheel speeds NF and NR. A wheel lock determining section 54 is applied with the wheel speeds NF and NR for detecting the lock of the wheels. The wheels may be locked when the deceleration dN/dt of the wheel speed NF or NR is extremely large. A lock signal from the determining section 54 and the vehicle speed V are applied to a hydraulic pressure controller 55 for controlling the modulator 34 through an output controller 56.

When the wheel speed NF or NR of the wheel is smaller than a pseudo vehicle speed Vc so that the wheel may be locked, the controller 55 produces a pressure reducing signal to reduce the hydraulic pressure.

When the wheel speed restores, a signal to increase the hydraulic pressure is produced. The output controller 56 applies an ABS signal based on those signals to the solenoid valves in the modulator 34. By repeating these operations, locking the wheels can be prevented.

A system for preventing the engine 1 from stalling while the ABS is operated and for providing sufficient output of the pump 20 is described hereinafter. When the engine speed Ne decreases at the operation of the ABS, it is determined that the engine 1 may stall. On the other hand, when the automatic clutch 2 is released, the engine speed Ne rapidly decreases, so that the output of the pump 20 temporarily becomes small below a rated output. Thus, the pump output must be increased for a short time.

More particularly, the control unit 40 is provided with a clutch release determining section 60 to which the engine speed Ne and the ABS signal from the output controller 56 are fed. When the engine speed Ne is rapidly decelerated at a rate dNe/dt larger than a predetermined reference rate A and when the engine speed Ne reduces to a lower value than a predetermined reference engine speed B, the engine stall is expected to occur. Therefore, a clutch release signal is fed from the clutch release determining section 60 to the clutch control section 52, thereby releasing the clutch 2. The clutch release signal is further fed to an idle speed control section 61 which operates to actuate the actuator 62 mounted on the throttle valve 1a of the engine 1 so as to increase engine speed Ne for a predetermined period of time C.

In operation, while the vehicle is at a stop, the cylinder 10 of the driven pulley 8 is supplied with the line pressure, and the cylinder 9 of the drive pulley 7 is drained, since the $N_P$, $N_S$, $\theta$ are zero and the duty ratio D is zero. Thus, in the pulley and belt device of the continuously variable belt-drive transmission, the drive belt 11 engages with the driven pulley 8 at a maximum running diameter to provide the largest transmission ratio (low speed stage).

When the accelerator pedal is depressed, the clutch current increases progressively with an increase of the engine speed Ne. The automatic clutch 2 is gradually engaged, transmitting the engine power to the drive pulley 7. The power of the engine 1 is transmitted to the output shaft 6 at the largest transmission ratio by the drive belt 11 and the driven pulley 8, and further transmitted to the axles 17 of the driving wheels 16 through the intermediate shaft 13 and the deferential 15. Thus, the vehicle is started. When the vehicle speed (output signal $N_s$) exceeds a predetermined value, the clutch 2 is entirely engaged.

When the throttle valve is opened for acceleration of the vehicle, the desired transmission ratio id is calculated based on the desired drive pulley speed and the throttle position $\theta$. Further, the desired transmission ratio changing speed di/dt and the transmission ratio changing speed di/dt are calculated based on the actual transmission ratio i and the desired transmission ratio id so that the duty ratio D for the valve 23 is obtained in dependency on the actual and desired transmission ratios i, id.

As the difference between the desired ratio id and actual ratio i becomes large and the desired transmission ratio changing speed di/dt becomes large, the duty ratio D for the valve 23 becomes large, thereby increasing the actual transmission changing speed di/dt.

When the opening degree of the throttle valve is reduced for deceleration, the duty ratio D is reduced along a low engine speed line, thereby draining the cylinder 9. Thus, the transmission is downshifted. The transmission ratio changing speed at downshifting increases with reducing the duty ratio D.

The control operation of the line pressure will be described hereinafter. The pump 20 driven by the engine 1 applies the oil to the line pressure control valve 22. When the engine torque Te obtained in accordance with the throttle opening degree $\theta$ and the engine speed Ne is large in a low engine speed range, the desired line pressure is large. The solenoid operated on-off valve 27 is operated at the duty ratio $D_L$ corresponding to the desired line pressure thus increasing the line pressure $P_L$. As the engine torque Te decreases in a high engine speed range, the line pressure $P_L$ is reduced. Thus, the power is transmitted through the transmission without slipping the belt.

When the brake pedal 31 is depressed during the driving condition, the master cylinder 32 produces the brake fluid pressure which is supplied to the brake devices 35 to brake the wheels. As a result, the vehicle speed and the driven pulley speed $N_S$ are decreased, so that the transmission ratio control section 50 operates the transmission ratio control valve 23 to downshift the transmission ratio.

Figures 3A, 3B, 3C, 3D, 3E:
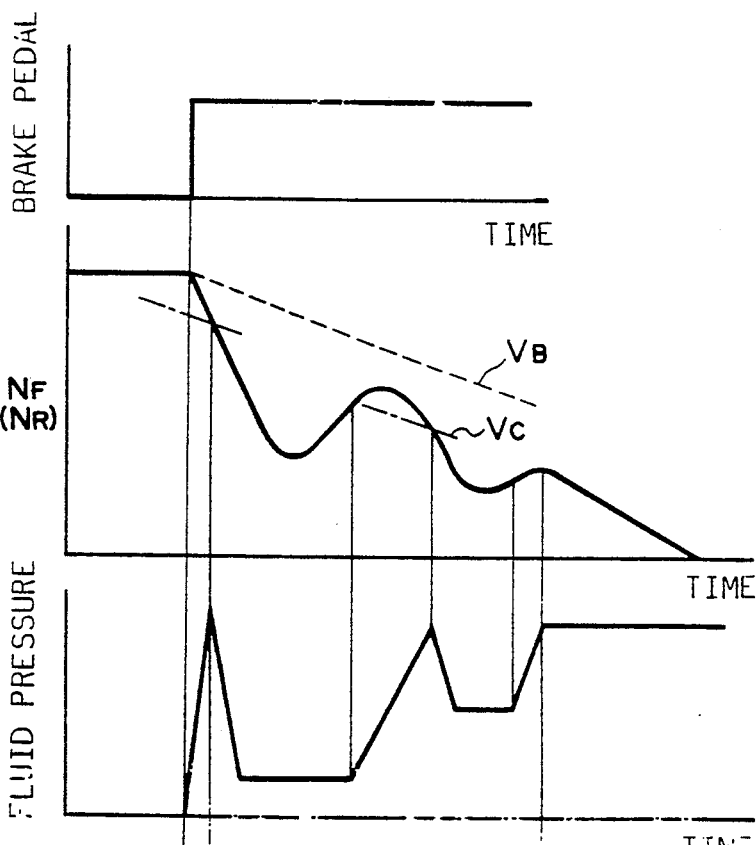
FIGS. 3a to 3e show characteristics of an operation of the ABS.

On the other hand, it is determined at the wheel lock determining section 54 if the wheels are going to be locked at a rapid deceleration of the wheel speed NF or NR. Namely, when the vehicle is braked on a road having a low friction coefficient, the front-wheel speed NF or the rear-wheel speed NR rapidly decreases as shown in FIG. 3b. The antilock controller 55 produces an ABS signal to increase, maintain or decrease the fluid pressure in accordance with the difference between the speed NF or NR and the pseudo vehicle speed Vc. The ABS signal is applied to the modulator 34 through the output controller 56 for regulating the pressure. Thus, the fluid pressure for the brake 35 is modulated as shown in FIG. 3c. Hence the wheel speed NF or NR is decreased corresponding to the actual vehicle speed VB without causing the locking of the wheels.

At the same time, the clutch release determining section 60 determines the release of the clutch 2 to prevent the engine 1 from stalling in accordance with the decrease of the engine speed Ne. Thereafter, the program shown in the flowchart shown in FIG. 4 is executed.

When the engine speed Ne becomes lower than the reference speed B, the clutch release signal is fed to the clutch control section 52 to compulsorily release the clutch as shown in FIG. 3d, thereby preventing the engine 1 from stalling. On the other hand, the idle speed control section 1 is operated for the time C. Thus, the actuator 62 is actuated so that the throttle valve 1a is opened wider for the time C to increase the idling engine speed. Consequently, the idling speed, which may decrease as shown by a dotted line in FIG. 3e caused by the release of the automatic clutch 2, is prevented from decreasing. Thus, the engine speed Ne and hence the displacement of the pump 20 are maintained as shown by a solid line. Accordingly, the line pressure control valve 22 can be operated to provide an optimum line pressure corresponding to the slow decreasing of the output of the pump 20. Thus, gripping the belt 11 by the pulleys 7 and 8 is ensured.

From the foregoing it will be understood that the present invention provides a continuously variable belt-drive transmission for a vehicle having an ABS where the engine stall is prevented by releasing the clutch during the operation of the ABS. At the same time, the idle speed is increased to prevent a rapid decline of the output of the pump, thereby preventing the belt from slipping.

While the presently preferred embodiment of the present invention that this disclosure is for the purpose of illustration and that various changes and modifications may be made without departing from the scope of the invention as set forth in the appended claims.

What is claimed is:

1. A system for controlling speed of an engine for a motor vehicle having a continuously variable belt-drive automatic transmission, an automatic clutch provided between the engine and the automatic transmission, an engine speed sensor for detecting speed of said engine, a wheel speed sensor for detecting speed of wheels of said vehicle, a hydraulic control system including an oil pump and a hydraulic circuit for controlling the transmission, the system comprising:

determining means responsive to the speed of the wheels for detecting a rapid deceleration of the wheels and for producing a wheel deceleration signal;

clutch release determining means responsive to said wheel deceleration signal for producing a clutch release signal when the engine speed is lower than a predetermined low speed;

clutch control means responsive to said clutch release signal for releasing said automatic clutch; and actuating means responsive to said clutch release signal for increasing the speed of the engine, thereby maintaining sufficient output of said oil pump.

2. The system according to claim 1, further comprising
an antilock brake system responsive to said wheel deceleration signal for producing an antilock brake signal, and
said clutch release determining means being arranged to respond to the antilock brake signal to produce said clutch release signal.

3. The system according to claim 1, wherein
said actuating means functions for a predetermined time after generation of said clutch release signal.

4. The system according to claim 1, wherein
said actuating means is provided for actuating a throttle valve to keep a predetermined opening degree for a designated time.

* * * * *